United States Patent [19]

Williams

[11] Patent Number: 4,796,955
[45] Date of Patent: Jan. 10, 1989

[54] ELASTIC MEMBRANE SEAT WITH FLUIDIC BLADDER TENSIONING APPARATUS AND METHOD

[75] Inventor: Jerry K. Williams, Sterling Hts., Mich.

[73] Assignee: General Motors Corporation, Detroit, Mich.

[21] Appl. No.: 116,575

[22] Filed: Nov. 4, 1987

[51] Int. Cl.⁴ .................................................. A47C 7/02
[52] U.S. Cl. ..................................... 297/452; 5/447; 297/284; 297/459; 297/DIG. 3
[58] Field of Search .............. 297/284, 452, 458, 459, 297/460, DIG. 3; 5/446, 447

[56] References Cited

U.S. PATENT DOCUMENTS

| | | | |
|---|---|---|---|
| 1,275,306 | 8/1918 | Rosenshine | 297/DIG. 3 X |
| 1,928,675 | 10/1933 | Sampson | 297/DIG. 3 X |
| 2,627,077 | 2/1953 | Forsyth | 297/DIG. 3 X |
| 2,627,302 | 2/1953 | Forsyth | 297/DIG. 3 X |
| 3,117,819 | 1/1964 | Kudriavetz, Jr. | 297/DIG. 3 X |
| 4,462,635 | 7/1984 | Lance | 297/284 |
| 4,589,695 | 5/1986 | Isono | 297/284 |
| 4,702,522 | 10/1987 | Vail et al. | 297/452 |

FOREIGN PATENT DOCUMENTS

| | | | |
|---|---|---|---|
| 2587201 | 3/1987 | France | 297/284 |
| 194120 | 11/1982 | Japan | 297/DIG. 3 |
| 194119 | 11/1982 | Japan | 297/DIG. 3 |
| 205238 | 12/1982 | Japan | 297/284 |
| 218183 | 7/1924 | United Kingdom | 297/459 |

Primary Examiner—Kenneth J. Dorner
Assistant Examiner—Peter R. Brown
Attorney, Agent, or Firm—Ernest E. Helms

[57] ABSTRACT

A vehicle seat is provided with an elastic membrane which may be selectively tensioned by a bladder. In a preferred embodiment the frequency of the seat may be selectively modified by selective inflation of the bladder. The bladder also allows the membrane to be wrapped to a frame of the seat in such a manner to increase the predicted life cycle of the seat membrane utilized.

6 Claims, 2 Drawing Sheets

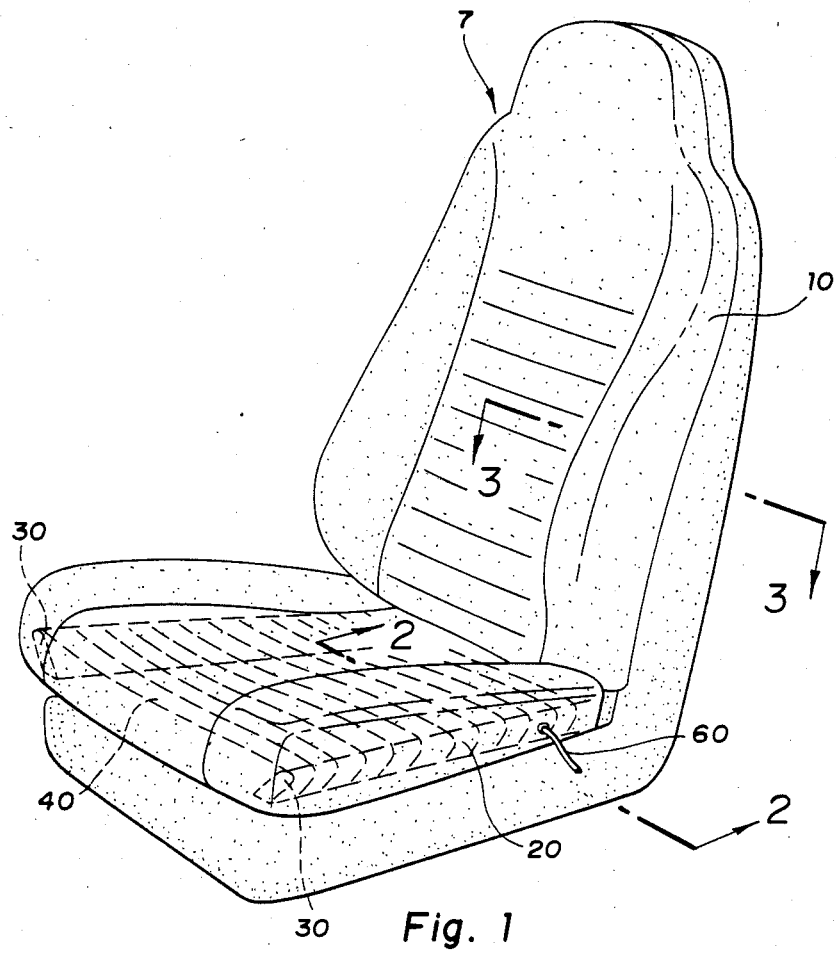
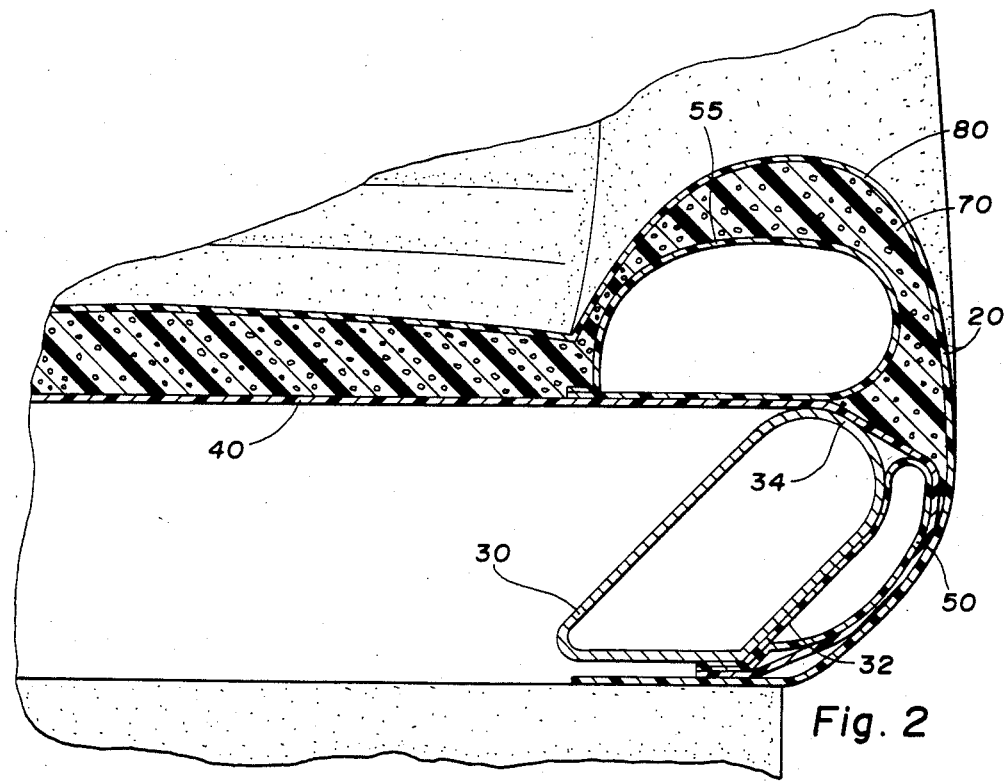

ELASTIC MEMBRANE SEAT WITH FLUIDIC BLADDER TENSIONING APPARATUS AND METHOD

The field of the present invention is that of vehicle seats which utilize elastically spanning membranes to provide a support surface. More particularly, the present invention relates to a vehicle seat which utilizes an elastomeric filament membrane.

DISCLOSURE STATEMENT

It is known that improved seating can be provided by utilizing seats with membranes which elastically span the seat frame members. The use of membranes comprised of elastomeric filaments pre-stretched across the seat frame and back rest frame is shown in Abu-Isa et al, U.S. Pat. No. 4,545,614, commonly assigned and the disclosure thereof is incorporated by reference herein.

Prior to the present invention, seats which used an elastically spanning membrane as taught in Abu-Isa typically utilized a motor coupled by a gear train with a roller to tension the filaments to give the seat the desired stiffness.

SUMMARY OF THE INVENTION

The present invention provides such a seat with an elastically spanned membrane member which has a bladder which is selectively inflatable to tension the filaments. The use of the bladder to tension the membrane provides several advantages. One advantage of the bladder is that the weight associated with the roller and gears is eliminated with a resultant net saving in vehicle weight. Another advantage of the bladder is that the filaments of the membrane are wrapped around a mandrel which has a much greater radius than the radius of the prior roller. Still another advantage of the bladder is that it provides additional spring and dampening to the seating system as will be described.

It is object of the present invention to provide a vehicle seat including a frame with at least two space members, a membrane elastically spanning the frame space members providing a support surface for the seat, and a selectively inflatable fluid bladder with means of connection of the frame and the membrane whereby the tension of the membrane is a function of the inflation of the bladder.

It is another object of the present invention to provide a vehicle seat construction including a frame with at least two spaced members, an elastomer filament membrane elastically spanning the frame spaced members providing a support surface for the seat, a selectively inflatable side support bladder providing a support surface for the seat in an orientation generally transverse to the membrane, and a first selectively inflatable fluid bladder with means of connection with the membrane whereby the tension of the membrane is a function of the inflation of the bladder.

It is still yet another object of the present invention to provide a method of varying the frequency response of a spaced framed member vehicle seat, the method including elastically spanning the spaced frame members with a membrane to provide a support surface for the seat, connecting to the membrane and to at least one of the frame members a selectively inflatable fluid bladder, selectively inflating the fluid bladder whereby the tension of the membrane is varied.

Other objects and advantages of the present invention will become more apparent to those skilled in the art as the nature of the invention is better understood from the accompanying drawings and a detailed description.

BRIEF DESCRIPTION OF THE DRAWINGS

FIG. 1 is a perspective view of a preferred embodiment vehicle seat constructed according to the present invention;

FIG. 2 is a view taken along line 2—2 of FIG. 1;

DETAILED DESCRIPTION OF THE DRAWINGS

Figure 3:
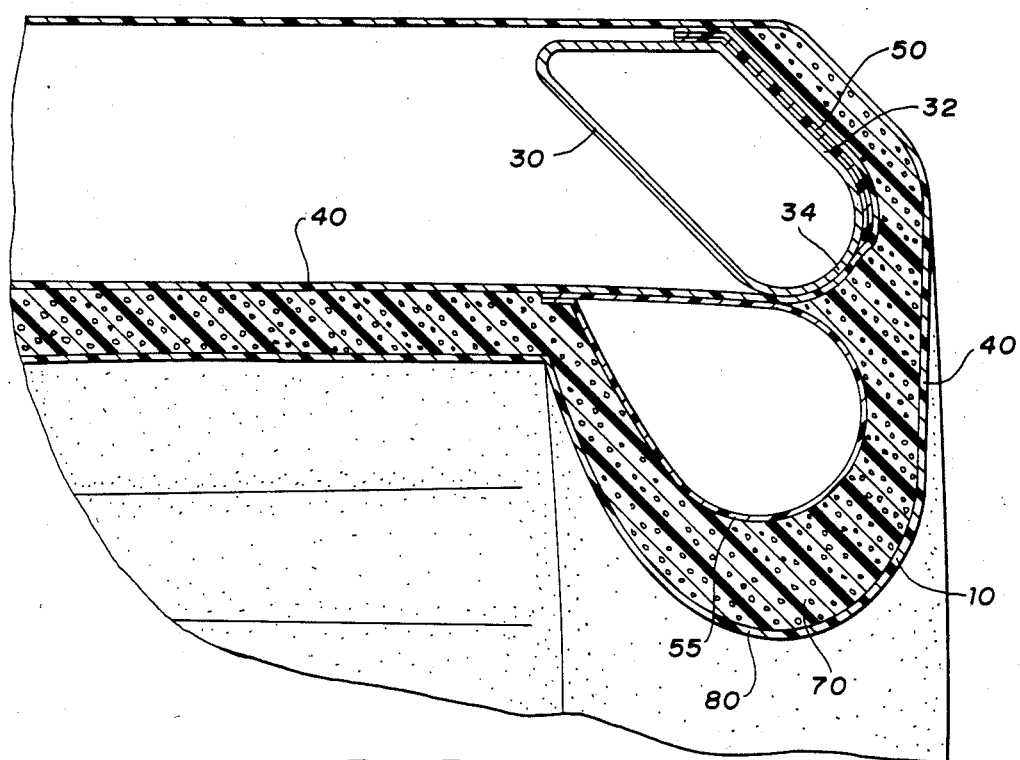
FIG. 3 is a line taken along line 3—3 of FIG. 1.

Referring to FIGS. 1, 2 and 3, the seat 7 of the present invention has a seat back 10 and a seat cushion 20. The seat frame 30 has at least two spaced apart members and is typically fabricated from a metallic tubular material. A membrane 40 is elastically spanned over the frame 30 providing a support surface between the two spaced member 30 for the seat 7. The membrane typically will be comprised of elastomeric filaments pre-stretched between 20%–100% with a modulus of elasticity at 100% elongation which is at least five times more than that of natural rubber. Preferably these filaments will be between 0.2 and 2 millimeters preferably in the range of 0.5 millimeter diameter.

Figure 4:
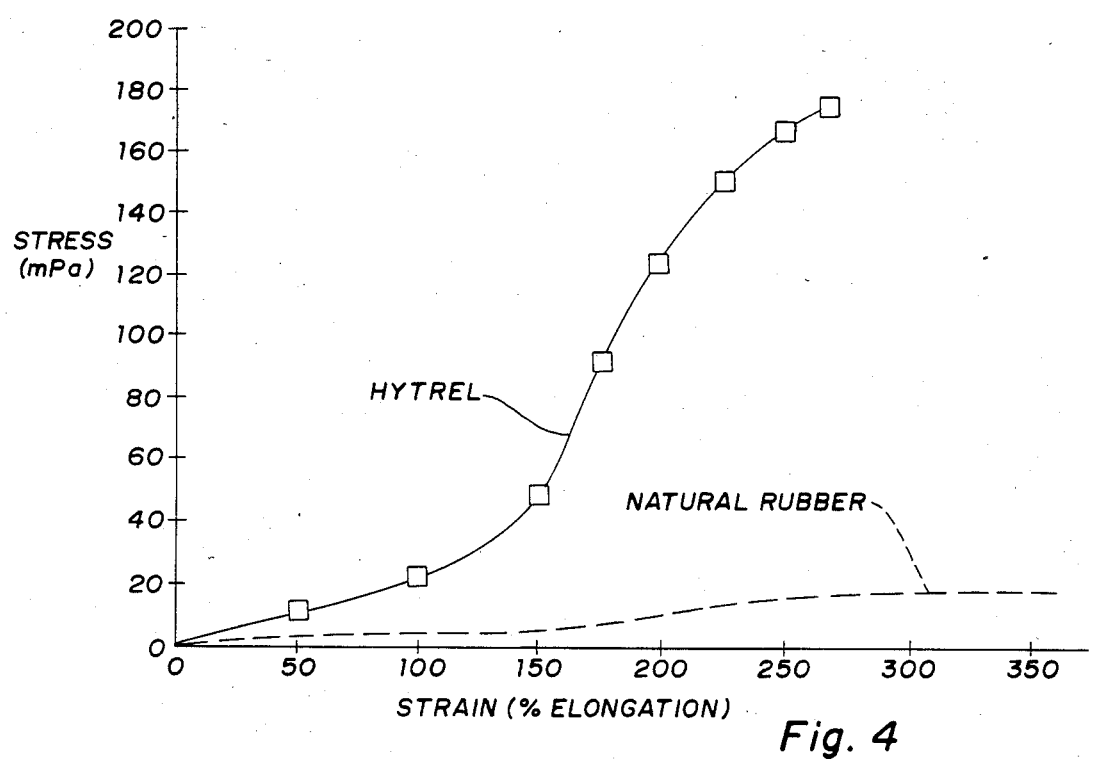
FIG. 4 is a stress strain diagram for the material Hytrel and natural rubber.

Typical examples of such materials are Hytrel (stress strained curve illustrated in FIG. 4) produced by the DuPont Company.

To selectively vary the tension in the membrane 40, there is provided along both side edges of seat 7 an inflatable first fluid bladder 50. Two fluidly joined first bladders 50 are provided for the seat cushion 20 and two fluidly joined first bladders are provided for the seat back 10. The first pneumatic bladders 50 have means of connection with the frame 30 and contact the membrane 40 beyond the support surface. Typically the first bladder 50 is connected on the outside surface 32 of the frame 30. The pneumatic bladder 50 is connected by line 60 by an air system (not shown) which is typically already provided to perform another function in the vehicle such as braking or for the suspension system air spring.

The membrane 40 is wrapped around the frame 30 trapping the bladder 50. The membrane 40 is stretched over frame radius 34 and bladder 50. Therefore the membrane 40 does not have to bend to meet a sharp radius and the life of the membrane 40 is prolonged. Utilizing the bladder 50 for the purpose of varying the tension in the membrane 40 provides several benefits. The firmness or "feel" of the seat 7 can be adjusted by varying the tension in the membrane 40. The other, more subtle, benefit is an ability to vary the seat natural frequency. The seat construction combination of a membrane 40 supported at the ends by the bladder 50 gives the seat 7 a natural frequency that is both different and variable as compared to the membrane 40 alone. The expression for natural frequency of a simple spring is as follows:

$$w = \sqrt{\frac{k}{m}}$$

w = natural frequency k=spring constant
m=mass

This is basically the simplified description of a conventional membrane seat. With the addition of the two inflatable bladders in the system, the equation is as follows:

$$w = \sqrt{\frac{\frac{k_1 k_2 k_3}{k_1 + k_2 + k_3}}{M}}$$

w=natural frequency
$k_1$=spring constant membrane
$k_2$, $k_3$ are the spring constants of the bladders
$k_2+k_3$ can be changed by adjusting the air pressure in the bladders 50.

The tensioning of membrane 40 by bladder 50 allows the seating height (or fore and aft positions of the seat back 10) of the membrane 40 under a given load to vary since the deflection of the membrane 40 is a function of its tension induced by the inflation of bladder(s) 50.

The bladders 50 are fluidly joined but need not be so. Also, valving means to release air to the atmosphere from bladders 50 can be added if desired to provide a prescribed damping.

On the side of the membrane 40 opposite the bladder 50 there is another second selectively inflatable bladder 55 providing side support for the seat in a direction generally transverse to the membrane 40. Covering the membrane 40 and the secondary bladder 55 is the foam padding 70 and cloth 80 of the seat 7.

The present invention provides a method of varying the frequency response of a spaced framed member 30, vehicle seat 7, including the following steps:

1. Elastically spanning the spaced frame members 30 with a membrane 40 to provide a support surface for the seat 7.
2. Connecting to the membrane 40 and to at least one of the frame members 30 a selectively inflatable fluid bladder 50.
3. Selectively inflating the fluid bladder 50 whereby the tension of the membrane 40 is varied.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive or privilege is claimed are defined as follows:

1. A vehicle seat, said seat in combination comprising:
   a frame with at least two spaced apart members;
   a prestretched membrane elastically spanning said spaced apart frame members providing a support surface for said seat and having at least one side portion partially wrapped around at least one of said frame members; and
   a selectively inflatable fluid bladder with means of connection to said frame and contacting said membrane beyond said support surface, said bladder being captured between said at least one side portion of said membrane and said frame member whereby the tension of said member is a function of the inflation of said bladder.

2. A vehicle seat as described in claim 1 wherein said bladder is pneumatically filled.

3. A vehicle seat as described in claim 1 wherein said membrane is comprised of an elastomeric filament.

4. A vehicle seat, said seat in combination comprising:
   a frame with two spaced apart members;
   an elastomer prestretched filament membrane elastically spanning said frame spaced apart members providing a support surface for said seat and having at least one side portion partially wrapped around at least one of said frame members; and
   separate selectively inflatable pneumatic bladder connected with each of said spaced apart frame members, and each said bladders contacting said membrane beyond said support surface, and said bladders being captured between said at least one side portion of said membrane and said spaced frame members whereby the tension of said membrane is a function of the inflation of said bladders.

5. A vehicle seat construction, in combination, comprising:
   a frame with at least two spaced apart members;
   an elastomer prestretched filament membrane elastically spanning said frame spaced apart members providing a support surface for said seat between said spaced apart members and having at least one side portion partially wrapped around at least one of said frame members;
   a second selectively inflatable side support bladder providing a support surface for said seat in an orientation generally transverse to said at least one side portion of said membrane; and
   a first selectively inflatable fluid bladder contacting said membrane beyond said support surface, said first bladder being captured between said at least one side portion of said membrane and said frame member whereby the tension of said membrane is a function of the inflation of said first bladder.

6. A vehicle seat construction as described in claim 5, wherein said second selectively inflatable support bladder is on a side of said membrane opposite from said selectively inflated first fluid bladder.

* * * * *